United States Patent
Ramaswamy et al.

(10) Patent No.: US 10,530,724 B2
(45) Date of Patent: Jan. 7, 2020

(54) LARGE DATA MANAGEMENT IN COMMUNICATION APPLICATIONS THROUGH MULTIPLE MAILBOXES

(71) Applicant: MICROSOFT TECHNOLOGY LICENSING, LLC, Redmond, WA (US)

(72) Inventors: Dheepak Ramaswamy, Bellevue, WA (US); Sanjay Ramaswamy, Redmond, WA (US); Le-Wu Tung, Redmond, WA (US); Song Yang, Redmond, WA (US); Julian Zbogar-Smith, Redmond, WA (US); Gagandeep Kohli, Redmond, WA (US); Sowmy Srinivasan, Redmond, WA (US); Kamal Janardhan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 694 days.

(21) Appl. No.: 14/737,454

(22) Filed: Jun. 11, 2015

(65) Prior Publication Data
US 2016/0269338 A1      Sep. 15, 2016

Related U.S. Application Data

(60) Provisional application No. 62/130,475, filed on Mar. 9, 2015.

(51) Int. Cl.
*G06F 15/16* (2006.01)
*H04L 12/58* (2006.01)

(52) U.S. Cl.
CPC ................................ *H04L 51/22* (2013.01)

(58) Field of Classification Search
CPC .............................. H04L 51/22; G06Q 10/107
(Continued)

(56) References Cited

U.S. PATENT DOCUMENTS 5,997,168 A * 12/1999 Harper ................ G05B 19/042
                                                              700/86
6,360,272 B1    3/2002 Lincke et al.
(Continued)

FOREIGN PATENT DOCUMENTS

EP          0840491 A1    5/1998
EP          1689137 A1    8/2006

OTHER PUBLICATIONS

"International Preliminary Report on Patentability Issued in PCT Application No. PCT/US2016/021286", dated May 23, 2017, 8 Pages.
(Continued)

*Primary Examiner* — Anthony Mejia
(74) *Attorney, Agent, or Firm* — Michael Best & Friedrich LLP

(57) ABSTRACT

Technologies are described to increase a data limit for a user of a communication application by introducing additional archive mailboxes as the original archive fills up or subsequently added archive mailboxes fill up. Thus, a user's data limit may be effectively removed through the use of N additional archive mailboxes. The additional mailboxes may be integrated into the architecture of the communication application such that their use is transparent to the user and/or an administrator of the communication application or associated service. In other examples, additional mailboxes may be used to add to the capacity of the primary mailbox (cached) as well.

18 Claims, 8 Drawing Sheets

(58) Field of Classification Search
USPC ............................................. 709/206
See application file for complete search history.

(56) References Cited

U.S. PATENT DOCUMENTS

| | | | |
|---|---|---|---|
| 6,396,513 B1* | 5/2002 | Helfman | G06Q 10/107 709/206 |
| 6,678,705 B1 | 1/2004 | Berchtold et al. | |
| 6,779,019 B1* | 8/2004 | Mousseau | H04W 4/02 340/7.21 |
| 7,136,897 B1 | 11/2006 | Raghunandan | |
| 7,505,571 B2* | 3/2009 | Bhatia | H04L 51/066 379/88.14 |
| 7,743,019 B2 | 6/2010 | Shah et al. | |
| 7,796,977 B2 | 9/2010 | Vander Veen | |
| 7,913,053 B1 | 3/2011 | Newland | |
| 8,131,809 B2 | 3/2012 | Consul et al. | |
| 8,140,604 B2 | 3/2012 | Ingen et al. | |
| 8,214,437 B1* | 7/2012 | Alspector | H04L 51/12 709/206 |
| 8,285,799 B2 | 10/2012 | Edelen | |
| 8,301,662 B2* | 10/2012 | Lavoie | G06Q 10/00 707/796 |
| 8,326,932 B2 | 12/2012 | Khan et al. | |
| 8,380,675 B1* | 2/2013 | Dwivedi | G06Q 10/107 707/661 |
| 8,447,817 B2 | 5/2013 | Lavoie et al. | |
| 8,745,232 B2 | 6/2014 | Parthasarathy et al. | |
| 8,775,509 B2* | 7/2014 | Dirstine | H04L 67/02 709/201 |
| 8,843,452 B2 | 9/2014 | Baessler et al. | |
| 8,849,929 B2 | 9/2014 | Lindsay et al. | |
| 8,935,213 B2 | 1/2015 | Baessler et al. | |
| 9,152,685 B2* | 10/2015 | Kavuri | G06F 3/0647 |
| 9,317,417 B2* | 4/2016 | Lemus | G06F 17/30 |
| 2003/0151623 A1* | 8/2003 | Shimada | G06Q 10/107 715/752 |
| 2003/0208608 A1 | 11/2003 | Merriam | |
| 2004/0102957 A1 | 5/2004 | Levin | |
| 2004/0131081 A1* | 7/2004 | Bhatia | H04L 51/066 370/466 |
| 2004/0221048 A1 | 11/2004 | Ogier | |
| 2005/0144520 A1* | 6/2005 | Tuma | G06F 11/1458 714/15 |
| 2006/0080354 A1* | 4/2006 | Berger | G06F 17/30286 |
| 2006/0112166 A1* | 5/2006 | Pettigrew | G06Q 10/107 709/206 |
| 2007/0180033 A1* | 8/2007 | Singh | G06Q 10/107 709/206 |
| 2007/0244996 A1* | 10/2007 | Ahmed | G06Q 10/107 709/220 |
| 2008/0077676 A1* | 3/2008 | Nagarajan | G06Q 10/107 709/206 |
| 2008/0109448 A1* | 5/2008 | Aboel-Nil | G06Q 10/107 |
| 2008/0126442 A1* | 5/2008 | Cisler | G06F 11/1458 |
| 2008/0288598 A1* | 11/2008 | French | G06Q 10/107 709/206 |
| 2009/0037359 A1* | 2/2009 | Callanan | G06Q 10/107 706/47 |
| 2009/0234911 A1* | 9/2009 | Khavari | G06Q 10/107 709/203 |
| 2010/0145932 A1 | 6/2010 | Rook et al. | |
| 2010/0161737 A1* | 6/2010 | Consul | G06Q 10/107 709/206 |
| 2010/0217805 A1* | 8/2010 | Lavoie | G06Q 10/107 709/206 |
| 2011/0231371 A1* | 9/2011 | Logan | G06F 17/30073 707/668 |
| 2011/0264630 A1* | 10/2011 | Edelen | H04L 51/14 707/665 |
| 2012/0109898 A1* | 5/2012 | Baessler | G06Q 10/107 707/665 |
| 2012/0259817 A1* | 10/2012 | Baessler | G06Q 10/107 707/665 |
| 2012/0303718 A1* | 11/2012 | Chen | H04L 51/04 709/206 |
| 2013/0212200 A1* | 8/2013 | Dennis | H04L 51/22 709/206 |
| 2014/0181443 A1* | 6/2014 | Kottomtharayil | G06F 11/1458 711/162 |
| 2016/0269339 A1 | 9/2016 | Ramaswamy et al. | |

OTHER PUBLICATIONS

"International Search Report and Written Opinion Issued in PCT Application No. PCT/US2016/021286", dated May 11, 2016, 11 Pages.

McBee, et al., "Microsoft Exchange Server 2007: Implementation and Administration", In Book Microsoft® Exchange Server 2007: Implementation and Administration, John Wiley & Sons, Feb. 28, 2008, 1 Page.

Cunningham, Paul, "How to Create an Archive Mailbox in Exchange Server 2010", Retrieved from <<http://exchangeserverpro.com/create-archive-mailbox-exchange-server-2010/>>, Nov. 20, 2010, 17 Pages.

"Windows PowerShell", Retrieved from <<https://en.wikipedia.org/w/index.php?title=Windows_PowerShell&oldid=647876618>, Feb. 19, 2015, 30 Pages.

"Archive Manager Restful Web Service API", Retrieved from <<http://support-public.cfm.software.dell.com/1174_api_reference.pdf>, Jan. 31, 2013, 6 Pages.

"Ews-Exchange 2010- How to access the Archived Content Using API", Retrieved From <<http://stackoverflow.com/questions/3662511/exchange-2010-how-to-access-the-archived-content-using-api>>, Feb. 23, 2011, 1 Page.

"Mailbox Management", Published on: Jan. 6, 2014 Available at: http://www.cgsinc.com/en/software/unlimited-mailbox/solutions/mailbox-management.

"Symantec Enterprise Vault™ for Lotus Domino®", Retrieved on: Mar. 10, 2015 Available at: http://www.bwo.ch/upload/docs/pdf/Symantec%20EV7%20for%20Lotus%20Domino.pdf.

"Cloud-Based Email Archiving: A Practical Guide", Published on: Dec. 13, 2011 Available at: http://www.enterprisemanagement360.com/wp-content/files_mf/white_paper/wp_letter_archive_01_13_11.pdf.

"HP Email Archiving Software for Lotus Domino 2.1", Published on: Oct. 15, 2010 Available at: http://www8.hp.com/h20195/v2/getpdf.aspx/c04168411.pdf?ver=8.

"EMC ATMOS and Commvault Simpana 9 Archive Solution Brief", Published on: Jul. 2011 Available at: http://webcache.googleusercontent.com/search?q=cache:b06U9EZaCi4J:https://community.emc.com/servlet/JiveServlet/downloadBody/11123-102-1-43883/EMC+&cd=2&hl=en&ct=clnk&gl=in.

"In-Place Archiving in Exchange 2013", Published on: Mar. 15, 2013 Available at: https://technet.microsoft.com/en-us/library/dd979800%28v=exchg.150%29.aspx.

"Orca Virtual Email Archiving Appliance", Retrieved on: Mar. 10, 2015 Available at: http://www.intradyn.com/products/orca-virtual-email-archiver/ The original virtual email archiving appliance for VMware and Microsoft Hyper-V.

Spurzem, Bob, "Solve Exchange Storage Problems Once and for All", Published on: Apr. 2008 Available at: http://www.ironmountain.ro/~/media/FEE836518DFE4B519197650DA8605151.pdf.

"Accessing Exchange 2010 Mailbox Move History Data", Published on: Sep. 13, 2010 Available at: http://thoughtsofanidlemind.com/2010/09/13/exchange2010-move-history/.

"Life after Lotus Notes", Retrieved on: Mar. 10, 2015 Available at: http://www.ouboces.org/bmail/LifeAfterNotes.pdf.

Srinivasan, Sowmy, "Archive Multi Mailbox", Retrieved on: Mar. 13, 2015 Available at: https://msft.spoppe.com/teams/IPaed/Specs/Unlimited Mailbox/Large Mailbox (Dev Doc).docx?d=w6ab3989f5047424c89e78de33d22c400.

"Scaling Email Archives", Retrieved on: Mar. 13, 2015 Available at: http://msft.spoppe.com/teams/IPaed/Specs/Unlimited Mailbox/Scaling Email Archives.pptx?d=wb10262ebce3a4996b5bb931cc9b7fe8b.

(56) References Cited

OTHER PUBLICATIONS

"Second Written Opinion Issued in PCT Application No. PCT/US2016/021286", dated Oct. 31, 2016, 7 Pages.
"Flexible Archiving", Retrieved from http://www.mailstore.com/en/mailstore-server-features-archiving.aspx, Apr. 3, 2015, 3 Pages.
"MailStore Server", In White Paper of Mail Store, Apr. 1, 2014, 11 Pages.
"MailStore Server 7 Technical Specifications", In White Paper of Mail Store, Oct. 4, 2012, 8 Pages.
"Advisory Action Issued in U.S. Appl. No. 14/737,458", dated Jun. 11, 2018, 7 Pages.
"Final Office Action Issued in U.S. Appl. No. 14/737,458", dated Feb. 23, 2018, 28 Pages.
"Non Final Office Action Issued in U.S. Appl. No. 14/737,458", dated Sep. 18, 2017, 28 Pages.
"Office Action Issued in European Patent Application No. 16710620.2", dated Jul. 16, 2018, 7 Pages.
"Office Action Issued in European Patent Application No. 16711454.5", dated Jul. 16, 2018, 7 Pages.
"International Preliminary Report on Patentability Issued in PCT Application No. PCT/US2016/021415", dated May 26, 2017, 9 Pages.
"International Search Report and Written Opinion Issued in PCT Application No. PCT/US2016/021415", dated May 11, 2016, 12 Pages.
"Second Written Opinion Issued in PCT Application No. PCT/US2016/021415", dated Nov. 2, 2016, 8 Pages.
Perkio, et al., "Multi-Faceted Information Retrieval System for Large Scale Email Archives", In Proceedings of the IEEE/WIC/ACM International Conference on Web Intelligence, Sep. 19, 2005, 8 Pages.
"Summons to Attend Oral Proceedings Issued in European Patent Application No. 16711454.5", Mailed Date: Mar. 12, 2019, 9 Pages.
"Non Final Office Action Issued in U.S. Appl. No. 14/737,458", dated Feb. 1, 2019, 25 Pages.
"Summons to Attend Oral Proceedings Issued in European Patent Application No. 16710620.2", Mailed Date: Feb. 21, 2019, 9 Pages.
"Notice of Allowance Issued in U.S. Appl. No. 14/737,458", dated Aug. 22, 2019, 10 Pages.

* cited by examiner

LARGE DATA MANAGEMENT IN COMMUNICATION APPLICATIONS THROUGH MULTIPLE MAILBOXES

BACKGROUND

Communication applications enable two or more users to communicate electronically using multiple modes of communication such as email, text messaging, media exchange, audio communication, video communication, desktop sharing, data sharing, application sharing, and similar modes. Some communication applications include additional functionality such as scheduling, contact list management, task management and comparable ones. Items such as emails, exchanged text messages, contacts, calendar items, etc. may be saved in special storage containers called mailboxes. Due to the increase in the used communication modes, shared amounts of data, and expansion of electronic communications, data generated by the communication applications may reach large amounts fairly rapidly. Due to design considerations, memory limitations, and other factors, mailboxes are typically limited to predefined capacities, however.

For example, in some email applications, user mailboxes may be limited to 100 or 200 GB. Some communication applications may provide a primary mailbox and an online archive mailbox, where older items may be moved from the primary mailbox. However, the archive mailboxes typically have similar size limitations as primary mailboxes. Thus, users generating large amounts of communication data may hit the limits fast degrading their user experience. Conventional solutions include manual or automatic export of data from the communication application to other data storages (e.g., regular file folders), but such exported data is usually not readily available to the communication application making this type of remedy not satisfactory for users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to large data management in a communication application through multiple mailboxes. In some examples, a predefined size threshold of an online archive mailbox of associated with a user being reached may be detected. Upon detection, one or more additional online archive mailboxes may be created for the user. Communication application related data may then be stored in the one or more additional online archive mailboxes, where data in the online archive mailbox and in the one or more additional online archive mailboxes may be available for one or more functionalities of the communication application in a transparent manner to the user.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
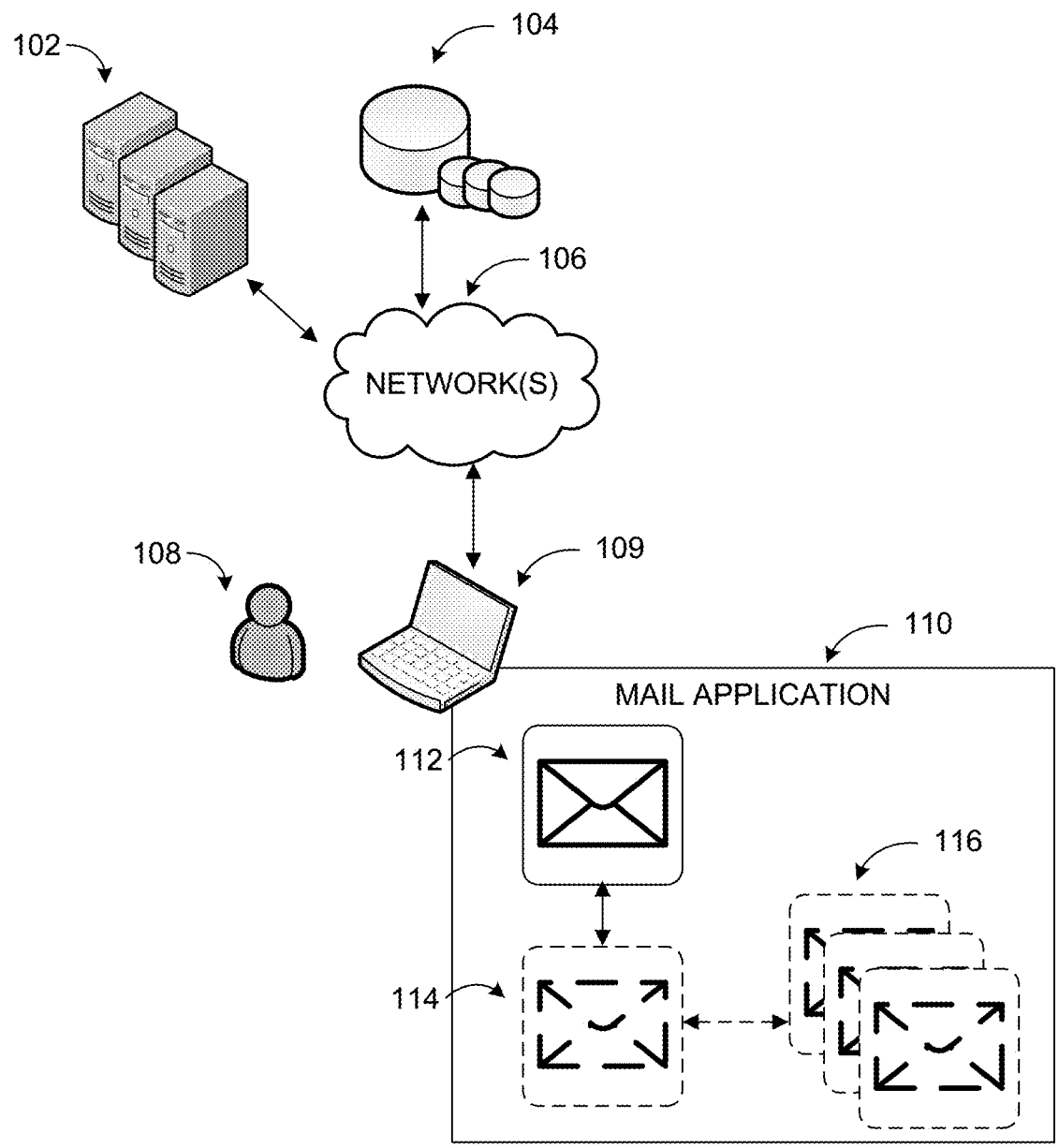
FIG. 1A through 1C illustrate example configurations in implementation of large data management in a communication application through multiple mailboxes.

As briefly described above, data limit for a user may be increased by introducing additional archive mailboxes as the original archive fills up or subsequently added archive mailboxes fill up. Thus, a user's data limit may be effectively removed through the use of N additional archive mailboxes. The additional mailboxes may be integrated into the architecture of the communication application such that their use is transparent to the user and/or an administrator of the communication application or associated service. In other examples, additional mailboxes may be used to add to the capacity of the primary mailbox (cached) as well.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a communication application or service with mailboxes to store data. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1B:
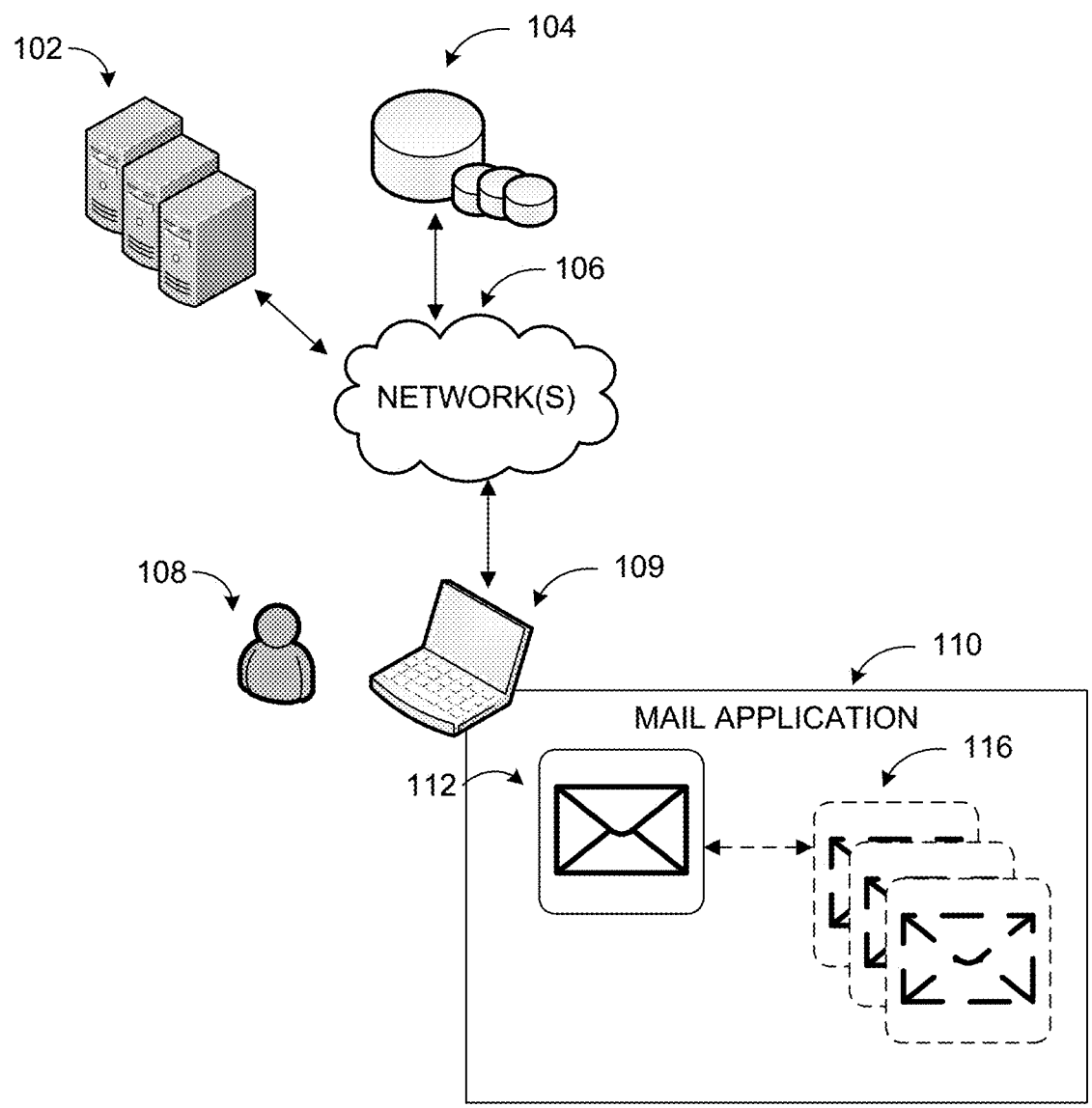
Figure 1C:
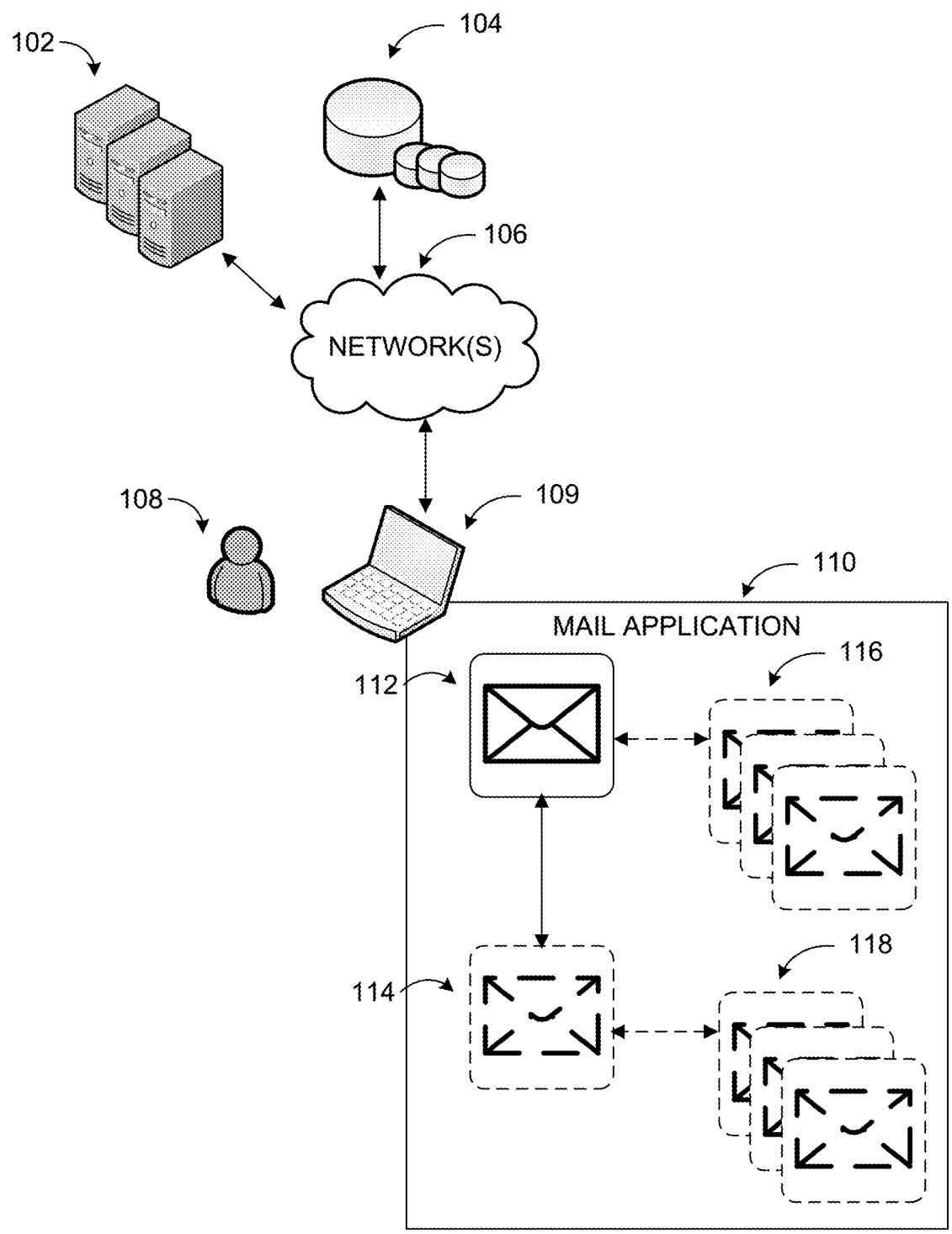

FIG. 1A through 1C illustrate example configurations in implementation of large data management in a communication application through multiple mailboxes.

Some communication applications/services may have technical hurdles that may prevent increasing the quota of mailbox container per user to large amounts (for example, 2 TB vs. current limits of 200 GB). Maximum mailbox size may be restricted by physical size of disk and total number of items per folder in a mailbox may be restricted due to performance considerations while indexing items and/or creating views. A maximum folder depth per mailbox may be restricted due to performance considerations for mailbox processing. Furthermore, a communication service may not have the ability to have more than two mailboxes per user (one primary and one archive mailbox) in some examples.

A service according to embodiments may be implemented on one or more servers 102 and facilitate communications between users (or subscribers) such as user 108 over one or more networks 106. The communication service may be accessed through thin clients such as web browsers on individual client devices or through thick clients (locally installed applications with more capabilities) such as mail application 110 on computing device 109. Some or all of the data associated with the service may be stored in data stores 104 and/or local data stores on client devices. While mail application 110 is used as an example client application herein, embodiments are not limited to emails. A communication service as disclosed herein may facilitate email exchange, messaging, online conferencing, audio communication, video communication, data sharing, application sharing, desktop sharing, and similar communication modes. Data associated with any of these modes may be stored in the mailboxes discussed herein.

A communication service according to embodiments may achieve "unlimited" storage for a single user by chaining mailboxes together. A normal user with, for example, less than 100 GB of data overall may either have just one primary mailbox 112 or have one primary mailbox 112 and one archive mailbox 114. The first archive mailbox 114 may be referred to as the archive "hierarchy" mailbox. However, when a user crosses over the predefined limit, they may end up having one primary mailbox 112, one archive "hierarchy" mailbox 114, and one or many archive "content" mailboxes 116.

Although the "archive" includes the hierarchy and content mailboxes, for a user it may appear as one single mailbox. For example, the user may see two nodes: one node for the primary mailbox 112 and one node for the "archive" (first archive mailbox 114 and additional "content" mailboxes 116). The user may have access to all the folders that the user created and the ones that the user imported along with system folders like Inbox and Sent Items.

When a communication application client requests content from a folder in any archive mailbox, the underlying service may provide that content if it is in the current archive mailbox as shown in the diagram. If the content is not in the mailbox, the service may provide a pointer to the mailbox and folder containing it. Allowing the client to directly request content from the appropriate mailbox, which could be on a different database/server than other archive mailboxes, may respect the tenets of brick architecture by avoiding server-side fan out calls.

When any one of the archive hierarchy/content mailbox reaches the mailbox quota, one or few of the folders in the mailbox may be moved to the other archive "content" mailboxes through an "auto-split" process, thereby freeing up space for growth. The auto-split threshold may be at the tenant level, in some implementations.

The complete folder hierarchy may be stored in the archive "hierarchy" and the archive "content" mailboxes. In some cases, the archive hierarchy mailbox may have the "writable" most recent copy of the folder hierarchy. The folder hierarchy in the archive content mailboxes may be updated periodically using a synchronization process. The end user, when accessing the "archive", may connect only to the archive hierarchy mailbox. From there, all folder/content requests may be redirected appropriately.

In the example configuration of FIG. 1A, the additional mailboxes 116 are chained to the first archive mailbox 114 in a transparent manner to the user 108. Embodiments are not limited to this example configuration, however. FIGS. 1B and 1C below illustrate additional configurations.

In the example configuration of FIG. 1B, the mail application 110 is configured with a primary mailbox (cached) 112 and the additional archive mailboxes 116 are chained directly to the primary mailbox 112. The first one of the additional archive mailboxes 116 may be configured to contain the hierarchy information as described above.

The auto-split or data partitioning process may include chaining of partitions created on the fly based on mailbox size, items counts, and/or ingestion size. A size limit for the homogeneous partitions may be selected to ensure optimal performance. Automatic size balancing and search across multiple partitions may be enabled. Moreover, folder based and other metadata based views across multiple partitions may be provided. The system may intelligently and securely determine partition where requested data resides. Partitions may be directly targeted by ingestion systems. The system may take care of intelligently distributing data to ensure individual partition limits are respected. The partitioning may be transparent to compliance management processes. Electronic discovery may be enabled to obtain knowledge of all user partitions from the system to return results from all owned partitions securely. Hold, records management, and comparable policies may be aware of all partitions of the user and maintain service level agreements.

In the example configuration of FIG. 1C, the mail application 110 is configured with a primary mailbox (cached) 112 and an archive mailbox 114. In this case, both the primary mailbox 112 and the archive mailbox 114 are chained with respective additional archive mailboxes 116 and 118. Thus, additional mailboxes and partitioning may be performed in a number of different configurations in a transparent manner to the user.

Figure 2:
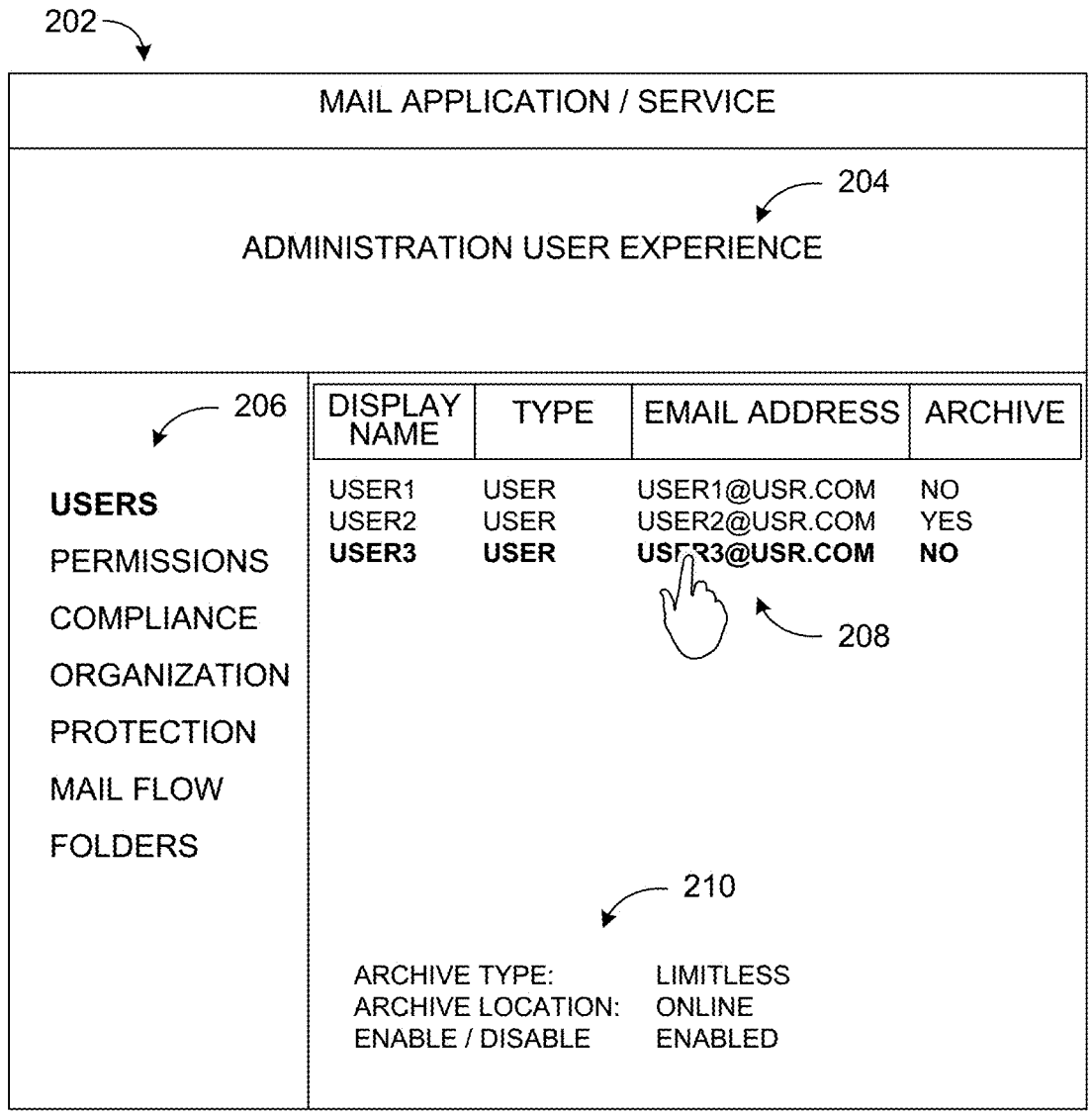
FIG. 2 illustrates an example user experience for an administrator of a communication service implementing large data management through multiple mailboxes.

FIG. 2 illustrates an example user experience for an administrator of a communication service implementing large data management through multiple mailboxes.

The administration user experience 204 of mail application/service 202 exemplifies a user interface that may be used to manage mailboxes in a communication application. Various attributes 206 associated with mailboxes and user accounts such as users, permissions, compliance, organizations, protection, mail flow, and folders may be selected and available properties for those attributes set/defined. A list of users 208 may be provided to enable an administrator to select among them and perform administrative tasks.

In an application/service according to embodiments, additional controls 210 may be provided to enable additional archive mailboxes, define archive type, or archive location. In some examples, a system according to embodiments may allow a generic way to request mailbox locations of any given type for a given directory object (e.g., obtain the location of a group's cloud mailbox). The system may also allow a generic way to manage mailbox locations regardless of mailbox type. For example, load balance all mailboxes that meet a particular criteria regardless of their nature and the attributes used to store that location on a directory entry.

Figure 3:
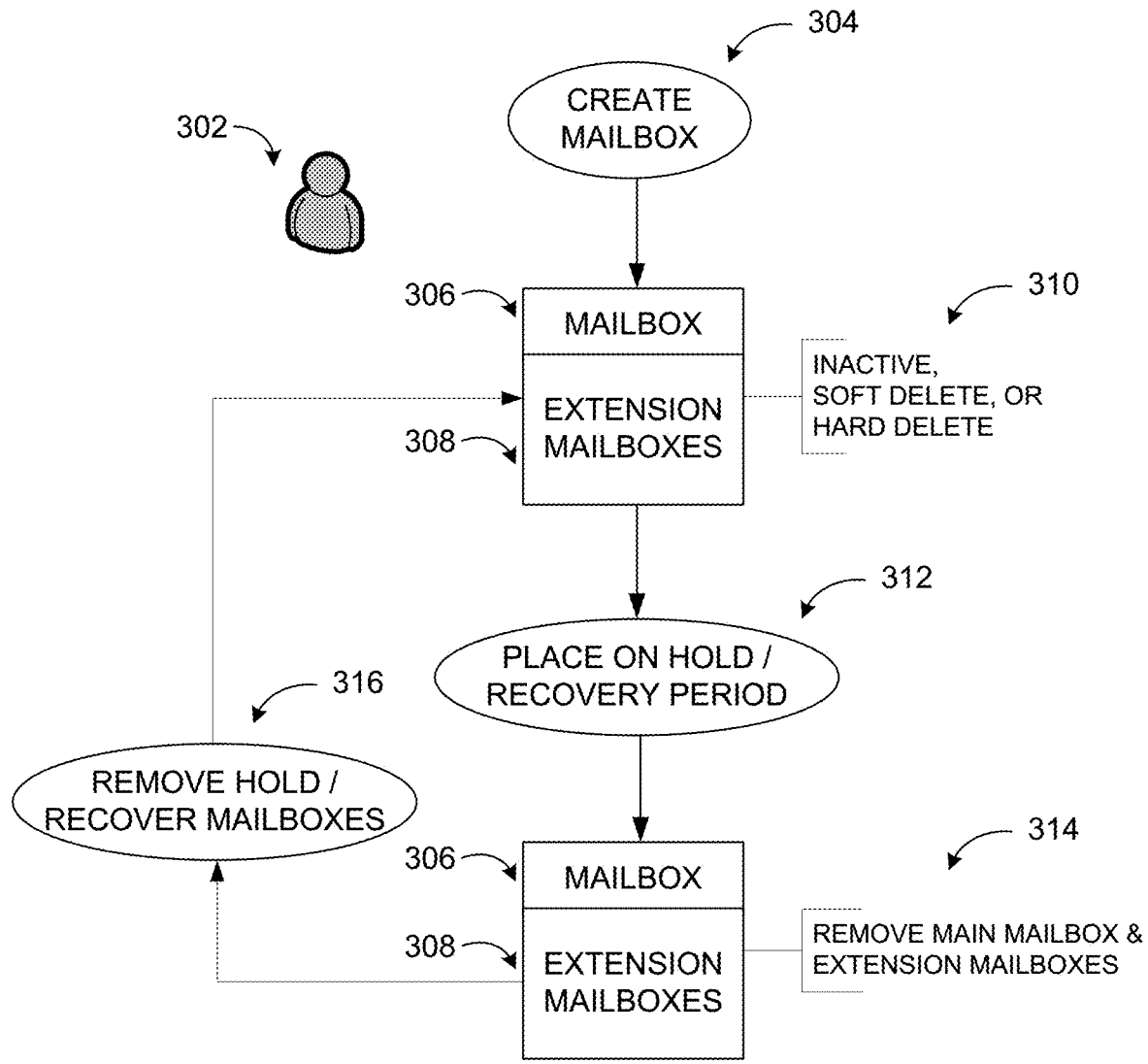
FIG. 3 illustrates example operations on a communication system with multiple mailboxes.

FIG. 3 illustrates example operations on a communication system with multiple mailboxes.

As discussed previously, the additional (or extension) mailboxes may be implemented in a transparent manner to the user, where items such as folders may be stored in various mailboxes with pointers to those in other mailboxes being placed in the primary mailbox or the first archive mailbox. Thus, a user may click on a folder that exists in a different mailbox and open the folder and see its contents without a noticeable difference.

If all items of a conversation are within a single folder, browsing items in both conversation and item views may be possible. However, if a conversation has items spread over multiple folders (e.g., item 1 and item 2 are part of the conversation, mailbox 1 and mailbox 2 belong to the set of archive mailboxes, not the primary mailbox), conversation and item views may be adjusted accordingly.

In viewing items in archive, if the user selects "all mailboxes" when switching between item and conversation view, the view settings may apply to all folders, wherever they are located. When switching between item and conversation view, if the user selects "this folder", the view settings may apply only to that folder (not its subfolders).

When a folder is moved, the communication application may be able to simply update the view and show the moved folder and its constituents under the target folder within an acceptable amount of time. Multiple folders selection may possible and move operations of multiple folders may be supported. If a user tries to move a small number of items/items of small size, cross server operations through the client may be fast and complete quickly. If a user tries to move a large number of items/items of large size, cross server operations through the client may not be fast. In such a scenario, a message to the user may be displayed letting them know that the operation has been queued and may complete within a particular time (depending on the size of items being moved, other operations on mailbox, store health, network health etc.). During the time that the operation is queued, if the user makes changes to the source list (like adding an item or deleting an item), the changes may be ignored, prevented, or considered. Once a move is queued, another move/copy on the same set of items/subset of items may fail with a message to the user indicating a different move is already queued and they have to wait until it completes.

Copy operations may be treated similar to move operations as described above. When a new folder is created, the view may be updated to reflect the new folder, which may inherit the permissions of the parent folder. Creation of the new folder may be performed through a hierarchy update operation.

Deleted items may be moved to a designated deleted items container, from which they may be recoverable. If items are recovered from the deleted items container, they may be moved back to their original location (folder).

Similar to folders and comparable items, additional mailboxes (extension mailboxes 308) themselves may also be subject to various operations. FIG. 3 illustrates some examples. Upon creation 304 of a mailbox (primary) 306 for user 302, extension mailboxes 308 may be created as the user approaches storage limits of existing mailbox(es). If inactivity is detected (310) after a predefined period of time, the one or more of the extension mailboxes (or even the primary mailbox 306) may be placed on hold (312) and removed permanently (316) upon expiration of the hold period. The mailboxes may also be removed permanently upon detection of a "remove" or hard delete command (314).

Upon detection of soft delete or hard delete command (310), one or more of the extension mailboxes (or even the primary mailbox 306) may be removed buy recoverable during a recovery period (312). During the recovery period, the mailboxes may be recovered 316 or removed permanently upon detection of a command (314).

The example scenarios and schemas in FIG. 1A through 3 are shown with specific components, data types, and configurations. Embodiments are not limited to systems according to these example configurations. Providing large data management in a communication application through multiple mailboxes may be implemented in configurations employing fewer or additional components in applications and user interfaces. Furthermore, the example schema and components shown in FIG. 1A through 3 and their subcomponents may be implemented in a similar manner with other values using the principles described herein.

The technical advantages of providing large data management in a communication application through multiple mailboxes may include increased efficiency in network usage, reduced processor usage (reducing need to access exported data), improved user efficiency, and improved user interaction performance by allowing management of large amounts and variety of communication related data without extra steps to access the data.

Figure 4:
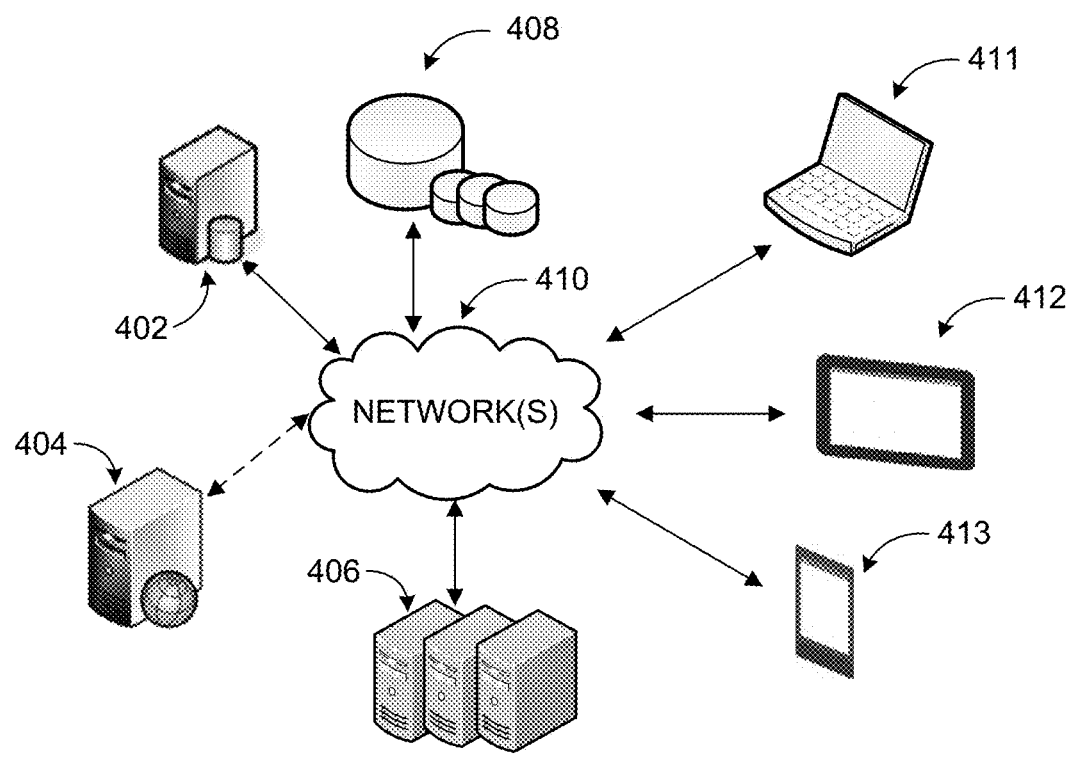
FIG. 4 is a simplified networked environment, where a system according to embodiments may be implemented.

FIG. 4 is an example networked environment, where embodiments may be implemented. A communication application or service configured to manage large amounts of data through the use of multiple mailboxes in a transparent manner to the user may be implemented via software executed over one or more servers 406 such as a hosted service. The platform may communicate with client applications on individual computing devices such as a smart phone 413, a mobile computer 412, or desktop computer 411 ('client devices') through network(s) 410.

Client applications executed on any of the client devices 411-413 may facilitate communications via application(s) executed by servers 406, or on individual server 404. The communication application or service may configure as many as needed archive mailboxes. The additional mailboxes may be integrated into the architecture of the communication application such that their use is transparent to the user and/or an administrator of the communication application or associated service. The communication application or service may store the item in data store(s) 408 directly or through database server 402.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide management of large amounts of data in communication applications through the use of multiple mailboxes in a transparent manner to the user. Furthermore, the networked environments discussed in FIG. 4 are for illustration purposes only. Embodiments are not limited to the example applications, modules, or processes.

Figure 5:
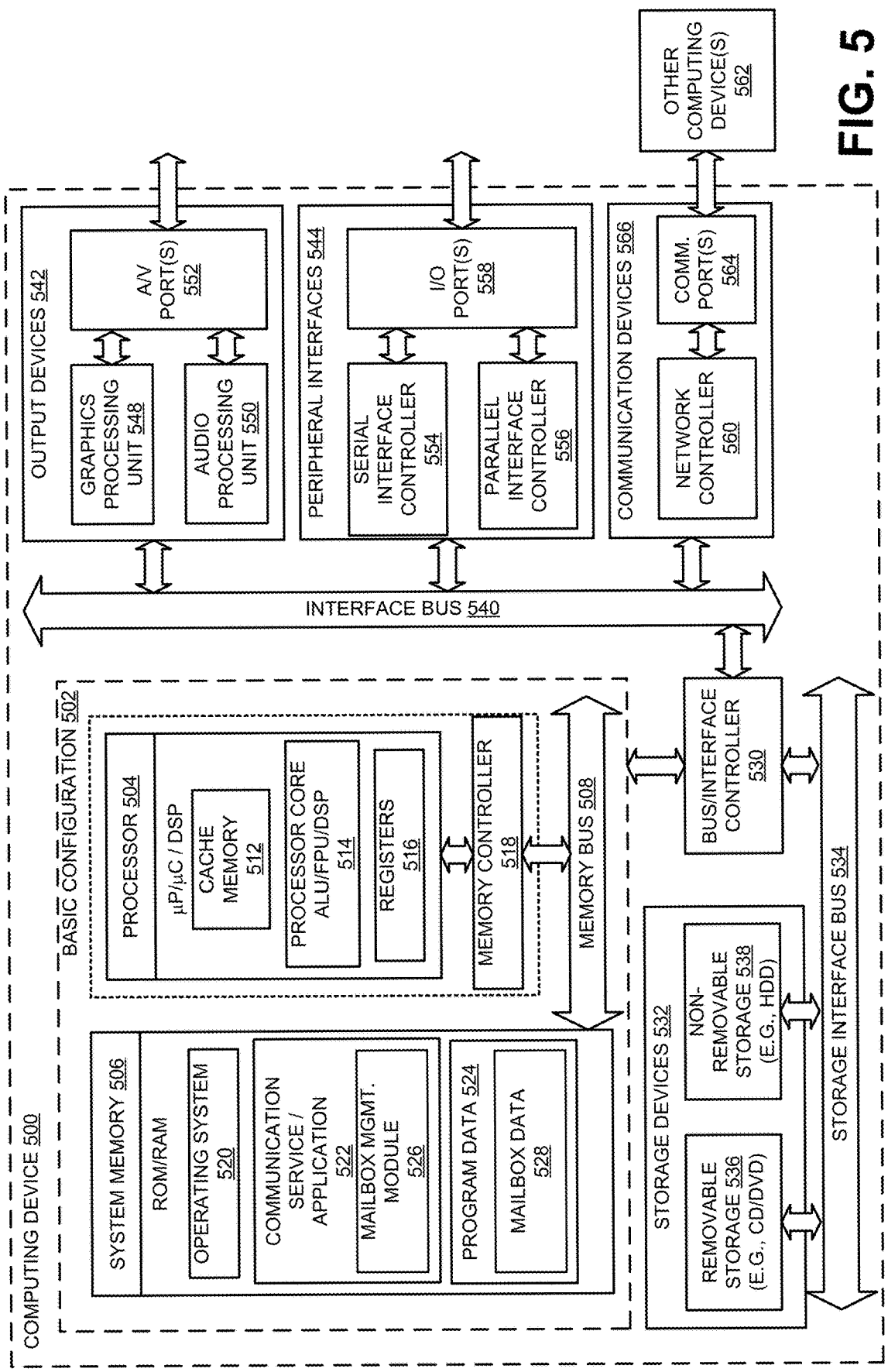
FIG. 5 is a block diagram of an example computing device, which may be used to implement large data management in a communication application through multiple mailboxes.

FIG. 5 is a block diagram of an example computing device, which may be used to implement large data management in a communication application through multiple mailboxes.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication service/application 522, and program data 524. The communication service/application 522 may include a mailbox management module 526 to increase data limit for a user by introducing additional archive mailboxes as the original archive fills up or subsequently added archive mailboxes fill up. The additional mailboxes may be integrated into the architecture of the communication application such that their use is transparent to the user and/or an administrator of the communication application/service 522. The program data 524 may include, among other data, mailbox data 528 that may be used to facilitate communications, as described herein.

The computing device 500) may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may also be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide management of large amounts of data in communication applications through the use of multiple mailboxes in a transparent manner to the user. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
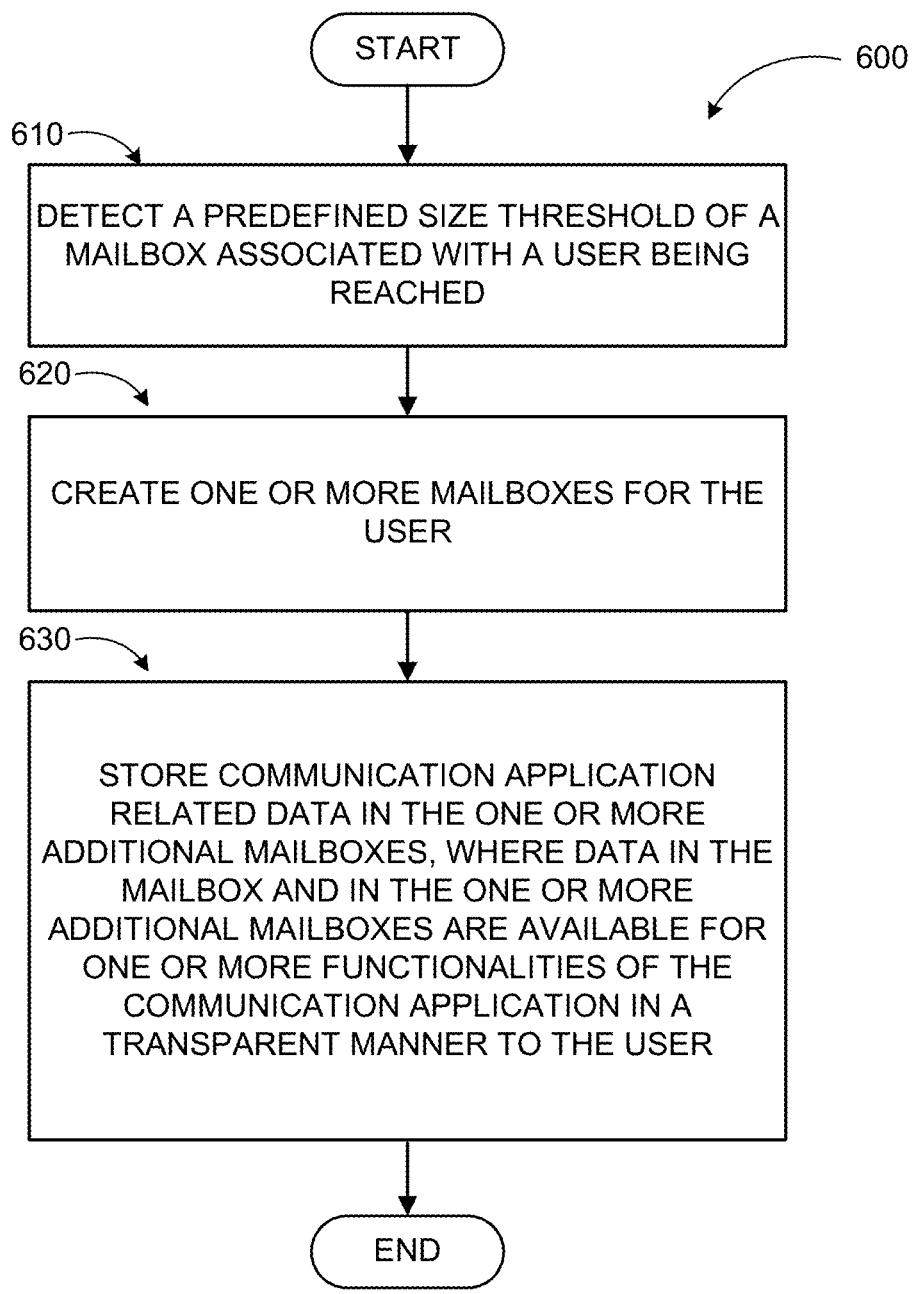
FIG. 6 illustrates a logic flow diagram of a method to provide large data management in a communication application through multiple mailboxes, according to embodiments.

FIG. 6 illustrates a logic flow diagram of a method to provide large data management in a communication application through multiple mailboxes, according to embodiments. Process 600 may be implemented on a computing device such as the computing device 600 or other system.

Process 600 begins with operation 610, where a communication application may detect that a predefined size threshold of a mailbox associated with a user is about to be reached. The mailbox may be a main mailbox (cached) or an archive mailbox. At operation 620, the communication application/service may create one or more additional mailboxes for the user. Depending on the type of the original mailbox (main or archive), the additional mailboxes may be associated with that mailbox.

At operation 630, communication application related data may be stored in the one or more additional mailboxes, where data in the mailbox and in the one or more additional mailboxes may be made available for one or more functionalities of the communication application in a transparent manner to the user.

The operations included in process 600 are for illustration purposes. Management of large amounts of data in communication applications through the use of multiple mailboxes in a transparent manner to the user may be implemented by similar processes with fewer or additional steps, as well as in different order of operations using the principles described herein.

According to some examples, a method executed on a computing device to provide large data management in a communication application through multiple mailboxes is described. An example method may include detecting a predefined size threshold of a mailbox associated with a user being reached; creating one or more additional archive mailboxes for the user; and storing communication application related data in the one or more additional archive mailboxes, where data in the mailbox and in the one or more additional archive mailboxes are available for one or more functionalities of the communication application in a transparent manner to the user.

According to other examples, the mailbox may be one of a primary mailbox and a first archive mailbox, and the method may also include creating the one or more additional archive mailboxes in chained manner connected to one of the primary mailbox and the first archive mailbox. The method may further include enabling the user to see a first node representing the primary mailbox and a second node representing the first archive mailbox and the one or more additional archive mailboxes. The method may also include storing the primary mailbox, the first archive mailbox, and the one or more additional archive mailboxes in one or more data stores, where the data stores include one of local data stores and online data stores.

According to further examples, the method may also include managing storage of the primary mailbox, the first archive mailbox, and the one or more additional archive mailboxes through one or more servers. The method may further include for communication application related data not stored in the primary mailbox or the first archive mailbox, creating one or more pointers to respective additional archive mailboxes in the primary mailbox or the first archive mailbox.

According to yet other examples, the method may also include upon detecting one of the primary mailbox, the first archive mailbox, and the one or more additional archive mailboxes reach a storage threshold, moving data to one or more other additional archive mailboxes through data partitioning. The data partitioning may include chaining of partitions created dynamically based on one or more of a mailbox size, an item count, and an ingestion size. The storage threshold may be defined at a tenant level within a communication service.

According to other examples, a computing device to provide large data management in a communication service through multiple mailboxes is described. The computing device may include a memory configured to store instruction associated with the communication service and one or more processors configured to execute one or more applications associated with the communication service in conjunction with the instructions stored in the memory. The one or more applications may include a communication application configured to facilitate exchange of communication in a plurality of modes between users and a data management application configured to manage communication application related data through mailboxes associated with the users and user groups. The data management application may be further configured to detect a predefined size threshold of an archive mailbox associated with a user being reached: create one or more additional archive mailboxes for the user: and store the communication application related data in the one or more additional archive mailboxes, where data in the archive mailbox and in the one or more additional archive mailboxes are available for one or more functionalities of the communication application in a transparent manner to the user.

According to further examples, the data management application may be further configured to store a folder hierarchy associated with the user in the archive mailbox and in one or more additional archive mailboxes designated as archive content mailboxes, and/or update the folder hierarchy stored in the archive content mailboxes through a periodic synchronization. The data management application may also be configured to partition data in one or more of the archive mailbox and the one or more additional archive mailboxes upon detecting the archive mailbox or the one or more additional archive mailboxes reach a storage threshold by chaining of partitions created dynamically based on one or more of a mailbox size, an item count, and an ingestion size.

According to yet other examples, the data management application may be further configured to enable automatic size balancing across the one or more additional archive mailboxes and searches across multiple partitions, and/or enable folder based and metadata based views across multiple partitions. The data management application may also be configured to provide partition information to one or more of an electronic discovery application, a records management application, and a compliance application. The plurality of modes may include one or more of an email exchange, a messaging exchange, an online conference, an audio communication, a video communication, a data sharing session, an application sharing session, and a desktop sharing session.

According to further examples, a computer-readable memory device with instructions stored thereon to provide large data management in a communication service through multiple mailboxes is described. The instructions may include detecting a predefined size threshold of an archive mailbox associated with a user being reached: creating one or more additional archive mailboxes for the user in a chained manner connected to the archive mailbox, where a folder hierarchy associated with the user is stored in the archive mailbox and in one or more additional archive mailboxes designated as archive content mailboxes; and storing communication application related data in the one or more additional archive mailboxes, where data in the archive mailbox and in the one or more additional archive mailboxes are available for one or more functionalities of the communication application in a transparent manner to the user.

According to some examples, the instructions may further include applying view settings to all folders independent of a folder location if the user selects "all mailboxes" when switching between an item view and a conversation view and applying the view settings to a selected folder if the user selects "this folder". The communication application related data may include one or more of emails, calendar items, attachments, tasks, contact cards, online conference recordings, audio communication recordings, video communication recordings, and text messages.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide large data management in a communication application through multiple mailboxes, the method comprising:
   receiving data associated with the communication application for storage in a mailbox associated with a user that is one of a primary mailbox and a first archive mailbox;
   detecting a predefined size threshold of the mailbox being reached based on an amount of the data associated with the communication application stored in the mailbox;
   in response to detecting the predefined size threshold of the mailbox being reached, automatically creating an additional archive mailbox for the user connected to one of the primary mailbox and the first archive mailbox in a chained manner;
   storing at least a portion of the data associated with the communication application in the additional archive mailbox, wherein the data associated with the communication application in the mailbox and in the additional archive mailbox is available for one or more functionalities of the communication application in a transparent manner to the user; and
   in response to detecting a particular period of inactivity within the additional archive mailbox, removing the additional archive mailbox.

2. The method of claim 1, further comprising:
   enabling the user to see a first node representing the primary mailbox and a second node representing the first archive mailbox and the additional archive mailbox.

3. The method of claim 1, further comprising:
   storing the primary mailbox, the first archive mailbox, and the additional archive mailbox in one or more data stores, wherein the one or more data stores include one of local data stores and online data stores.

4. The method of claim 1 further comprising:
   managing storage of the primary mailbox, the first archive mailbox, and the additional archive mailbox through one or more servers.

5. The method of claim 1 further comprising:
   for at least the portion of the data associated with the communication application stored in the additional archive mailbox, creating a pointer to the additional archive mailbox in the primary mailbox or the first archive mailbox.

6. The method of claim 1, further comprising:
   in response to detecting the predefined size threshold of the mailbox being reached, moving at least the portion of the data associated with the communication application to the additional archive mailbox through data partitioning.

7. The method of claim 6, wherein the data partitioning includes chaining of partitions created dynamically based on one or more of a mailbox size, an item count, and an ingestion size.

8. The method of claim 1, wherein the predefined size threshold is defined at a tenant level within a communication service.

9. A computing device to provide large data management in a communication service through multiple mailboxes, the computing device comprising:
- a communication interface configured to facilitate exchange of a communication in a plurality of modes between one or more users associated with the communication service, wherein the plurality of modes include one or more of an email exchange, a messaging exchange, an online conference, an audio communication, a video communication, a data sharing session, an application sharing session, and a desktop sharing session;
- a memory configured to store instructions associated with the communication service; and
- one or more processors configured to execute one or more applications associated with the communication service in conjunction with the instructions stored in the memory, wherein the one or more processors are configured to:
- receive data associated with the communication service for storage in an archive mailbox associated with a user;
- detect a predefined threshold of the archive mailbox being reached based on an amount of the data associated with the communication service stored in the archive mailbox;
- in response to detecting the predefined threshold of the archive mailbox being reached, automatically create an additional archive mailbox for the user connected to the archive mailbox in a chained manner;
- store at least a portion of the data in the additional archive mailbox, wherein the data associated with the communication service in the archive mailbox and in the additional archive mailbox is available for one or more functionalities of the communication service in a transparent manner to the user; and
- in response to detecting a particular period of inactivity within the additional archive mailbox, remove the additional archive mailbox.

10. The computing device of claim 9, wherein the one or more processors are further configured to:
- store a folder hierarchy associated with the user in the archive mailbox and in the additional archive mailbox, wherein the additional archive mailbox is designed as an archive content mailbox.

11. The computing device of claim 10, wherein the one or more processors are further configured to:
- update the folder hierarchy stored in the archive content mailbox through a periodic synchronization.

12. The computing device of claim 9, wherein the one or more processors are further configured to:
- partition the data associated with the communication service in one or more of the archive mailbox and the additional archive mailbox upon detecting the predefined threshold of the archive mailbox being reached by chaining of partitions created dynamically based on one or more of a mailbox size, an item count, and an ingestions size.

13. The computing device of claim 12, wherein the one or more processors are further configured to:
- enable automatic size balancing across the archive mailbox and the additional archive mailbox and searches across multiple partitions.

14. The computing device of claim 12, wherein the one or more processors are further configured to:
- enable folder based and metadata based views across multiple partitions.

15. The computing device of claim 12, wherein the one or more processors are further configured to:
- provide partition information to one or more of an electronic discovery application, a records management application, and a compliance application.

16. A computer-readable memory device with instructions stored thereon to provide large data management in a communication service through multiple mailboxes, the instructions comprising:
- receiving communication related data for storage in an archive mailbox associated with a user;
- detecting a predefined size threshold of the archive mailbox being reached based on an amount of the communication related data associated with the communication service stored in the archive mailbox;
- in response to detecting the predefined size threshold of the archive mailbox being reached, automatically creating an additional archive mailbox for the user in a chained manner connected to the archive mailbox, wherein the additional archive mailbox is designated as an archive content mailbox, and a folder hierarchy associated with the user is stored in the archive mailbox and in the additional archive mailbox;
- storing at least a portion of the communication related data associated with the communication service in the additional archive mailbox, wherein the communication related data associated with the communication service in the archive mailbox and in the additional archive mailbox are available for one or more functionalities of the communication service in a transparent manner to the user; and
- in response to detecting a particular period of inactivity within the additional archive mailbox, remove the additional archive mailbox.

17. The computer-readable memory device of claim 16, wherein the instructions further comprise:
- if the user selects "all mailboxes" when switching between an item view and a conversation view, applying view settings to all folders independent of a folder location; and
- if the user selects "this folder", applying the view settings to a selected folder.

18. The computer-readable memory device of claim 16, wherein the communication related data associated with the communication service includes one or more of emails, calendar items, attachments, tasks, contact cards, online conference recordings, audio communication recordings, video communication recordings, and text messages.

* * * * *